US010339377B2

(12) United States Patent
Joseph et al.

(10) Patent No.: US 10,339,377 B2
(45) Date of Patent: Jul. 2, 2019

(54) DEVICE AND METHOD FOR DETERMINING CHARACTERISTICS OF A CURRENCY NOTE

(71) Applicants: Kabushiki Kaisha Toshiba, Minato-ku (JP); Toshiba Infrastructure Systems & Solutions Corporation, Kawasaki-shi (JP)

(72) Inventors: Rajkumar Joseph, Bangalore (IN); Arya Sukumar, Bangalore (IN); Vijaya Kumar Tiruveedhula, Bangalore (IN)

(73) Assignees: Kabushiki Kaisha Toshiba, Minato-ku (JP); Toshiba Infrastructure Systems & Solutions Corporation, Kawasaki-shi (JP)

( * ) Notice: Subject to any disclaimer, the term of this patent is extended or adjusted under 35 U.S.C. 154(b) by 43 days.

(21) Appl. No.: 15/810,376

(22) Filed: Nov. 13, 2017

(65) Prior Publication Data
US 2019/0147240 A1 May 16, 2019

(51) Int. Cl.
*G07D 7/00* (2016.01)
*G06K 9/00* (2006.01)
*G06K 9/18* (2006.01)
*G06K 9/46* (2006.01)
*G06K 9/34* (2006.01)
*G06Q 20/00* (2012.01)

(52) U.S. Cl.
CPC .......... *G06K 9/00469* (2013.01); *G06K 9/18* (2013.01); *G06K 9/344* (2013.01); *G06K 9/4642* (2013.01); *G06K 2209/01* (2013.01)

(58) Field of Classification Search
CPC ................................. G06Q 20/00; G07D 7/00
USPC ........................................................ 382/135
See application file for complete search history.

(56) References Cited

U.S. PATENT DOCUMENTS

2009/0260947 A1* 10/2009 Liu ...................... G07D 7/1205
194/207
2010/0147942 A1 6/2010 Silverbrook et al.

FOREIGN PATENT DOCUMENTS

EP 0 660 276 A2 6/1995

* cited by examiner

*Primary Examiner* — Abolfazl Tabatabai
(74) *Attorney, Agent, or Firm* — Oblon, McClelland, Maier & Neustadt, L.L.P.

(57) ABSTRACT

Embodiment of the present disclosure discloses method and device for determining one or more characteristics of currency note. The currency evaluating device is configured to receive image of currency note and detect text from one or more predefined first regions of image. Further, language associated with detected text is identifies and one of single nationality and plurality of nationalities associated with language of currency note is obtained from data source associated with currency evaluating device. When single nationality is obtained, nationality of currency note is identified to be said single nationality. When plurality of nationalities is obtained, nationality of currency note is identified from plurality of nationalities using Optical Character Recognition (OCR). Upon identifying nationality, one or more characteristics of currency note is identified by extracting object features on image based on identified nationality.

12 Claims, 7 Drawing Sheets

DEVICE AND METHOD FOR DETERMINING CHARACTERISTICS OF A CURRENCY NOTE

TECHNICAL FIELD

The present subject matter is related in general to the field of image processing, more particularly, but not exclusively to a method and device for determining characteristics of a currency note using image processing.

BACKGROUND

Evaluating currency notes is an important task in financial institutes. Based on the evaluation, the currency notes may be identified and/or segregated as required. The evaluating may include determining one or more characteristics of the currency notes like nationality, denomination, series, counterfeit of the currency notes and so on. The determined one or more characteristics may be used for identifying and segregating the currency notes. The currency notes may be evaluated manually, where a user identifies and segregates the currency notes just by seeing or touching the currency notes. In recent developments, automated systems are configured to evaluate the currency notes. The automatic systems include plurality of applications for the evaluation. The plurality of applications is specifically configured to determine one or more characteristics of the currency notes belonging to corresponding nation. Generally, nations constantly change layout of their currency notes to limit counterfeit bank notes, cut production costs, improve longevity and so on. In these cases, evaluation of the currency notes may include plurality of applications for determining object features in the currency note. The object features may be, but are not limited to, portrait, symbols, emblems, denomination, serial number and so on.

Existing technologies include, one or more automated systems, where each system is configured to evaluate the currency notes of a single nation only. In such dedicated automated systems, the currency notes of the single nation are only evaluated and currency notes of other nations may not be evaluated. In other one or more automated systems, currency notes of plurality of nations may be evaluated. However, there may be a need for a user to specify nation, from the plurality of nations, of the currency notes which is to be evaluated. When the nation is specified by the user, method associated with the nation is performed for evaluation of the currency note of that nation.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method, for determining one or more characteristics of a currency note, performed by a currency evaluating devices. The method includes receiving an image of a currency note by a currency evaluating device and detecting text from one or more predefined first regions of the image. Further, the method includes identifying language associated with the detected text and obtaining one of a single nationality or a plurality of nationalities associated with the language of the currency note from a data source associated with the currency evaluating device. When the single nationality is obtained, nationality of the currency note is identified to be said single nationality. When plurality of nationalities is obtained, the nationality of the currency note is identified from the plurality of nationalities using Optical Character Recognition (OCR). Upon identifying the nationality, the one or more characteristics of the currency note is identified by extracting object features of the currency note based on the identified nationality.

In an embodiment, the present disclosure relates to a currency evaluating device comprising a processor and a memory. The memory is communicatively coupled to the processor and the memory stores processor-executable instructions which on execution cause the processor to perform step for determining one or more characteristics of the currency note. The steps include receiving an image of a currency note by a currency evaluating device and detecting text from one or more predefined first regions of the image. Further, the steps include identifying language associated with the detected text and obtaining one of a single nationality or a plurality of nationalities associated with the language of the currency note from a data source associated with the currency evaluating device. When the single nationality is obtained, nationality of the currency note is identified to be said single nationality. When plurality of nationalities is obtained, the nationality of the currency note is identified from the plurality of nationalities using Optical Character Recognition (OCR). Upon identifying the nationality, the one or more characteristics of the currency note is identified by extracting object features of the currency note based on the identified nationality.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, server to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to an efficient method to evaluate a currency note by determining one or more characteristics of the currency note. The one or more characteristics may be, but not limited to, series and denomination of the currency note. Initially, nationality associated with the currency note is identified and further the one or more characteristics are determined based on the identified nationality. The method includes identifying the nationality by detecting text on image of the currency note and determining the one or more characteristics by extracting object features on the image of the currency note based on the identified nationality. Initially, for determining the nationality, text is detected from one or more predefined first regions of the image obtained by the currency evaluating device. Upon detection of the text, language associated with the detected text is identified. Further, one of a single nationality and a plurality of nationalities associated with the language of the currency note is obtained from a data source associated with the currency evaluating device. When the language is associated with single nationality, nationality of the currency note may be identified as said single nationality. When language is associated with plurality of nationalities, the nationality of the currency note is identified from the plurality of nationalities using Optical Character Recognition (OCR). Upon identifying the nationality, the one or more characteristics of the currency note may be identified by extracting object features of the currency note based on the identified nationality.

Figure 1:
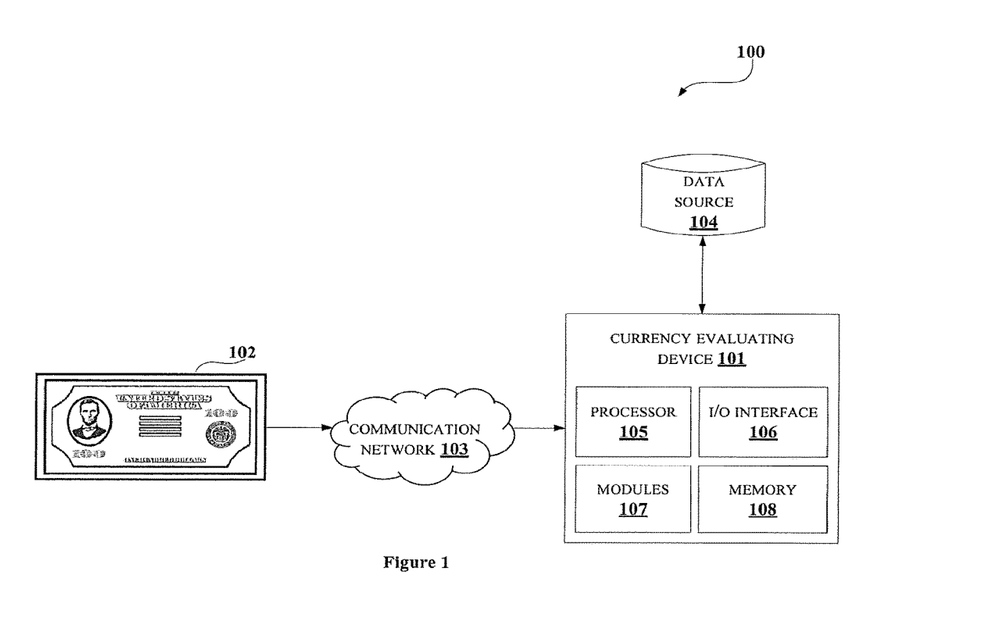
FIG. 1 illustrates an exemplary system for determining one or more characteristics of a currency note in accordance with some embodiments of the present disclosure.

FIG. 1 illustrates an exemplary system 100 for determining one or more characteristics of a currency note in accordance with some embodiments of the present disclosure.

As shown in FIG. 1, the system 100 comprises a currency evaluating device 101 to which an image of currency note 102 is provided, a communication network 103, and a data source 104.

The currency evaluating device 101 further comprises a processor 105, I/O interface 106, one or more modules 107 and a memory 108. The memory 108 may be coupled to the processor 105 and comprise data for determining the one or more characteristics of the currency note. The data source 104, in the system 100, stores predefined information which may be used for determining the one or more characteristics of the currency note. In an embodiment, the data source 104 may be coupled to the currency evaluating device 101 as shown in FIG. 1. In another embodiment, the data source 104 may be integrated within the currency evaluating device 101. The currency evaluating device 101 may be implemented in a variety of computing systems, such as a laptop computer, a desktop computer, a Personal Computer (PC), a notebook, a smartphone, a tablet, e-book readers, a server, a network server, and the like.

When the image of the currency note 102 is received by the currency evaluating device 101, nationality of the currency may be identified initially and then the one or more characteristics may be determined based on the nationality. The nationality may be identified by performing text detection on the image 102 and the one or more characteristics may be determined by performing object detection on the image 102. For determining the nationality, the text on the image 102 may be detected from one or more predefined first regions of the image 102. The one or more predefined first regions may be selected based on a predefined probability ranking. The predefined probability ranking provides ranking of the one or more predefined first regions on the image of currency note 102. In an embodiment, top ranked region from the one or more predefined first regions may be having highest probability of detection of the text. In an embodiment, least ranked region from the one or more predefined first regions may be having lowest probability of detection of the text. In a non-limiting embodiment, the currency evaluating device 101 performs detection of the text on the top ranked region first, followed by detection of the text on next ranked region. By this, need for detecting the text from each of the one or more predefined regions may be eliminated. Thereby, computational time required by the currency evaluating device for detecting text is reduced.

Upon detection of the text, language associated with the detected text is determined. The determined languages may be, but not limited to, Hindi, English, Chinese, Japanese, Arabic and so on. The determined language may be associated with currency notes of more than one nationality or may be associated with currency notes of single nationality. For example, consider English is the determined language, then English may be associated with currency notes of India, Canada, Australia, United States of America and so on. In this scenario, plurality of nationalities associated with English language of the currency note is obtained from the data source 104. Consider Hindi is the detected text. In this scenario, Hindi is associated with the currency notes of India only. Therefore, the single nationality obtained may be India. Further, when the single nationality is obtained, nationality of the currency note is identified as said single nationality. When the plurality of nationalities is obtained, the nationality of the currency note is identified from the plurality of nationalities using Optical Character Recognition (OCR). In an embodiment, the OCR includes performing electronic OCR on the detected text. In the electronic OCR, the detected text is initially digitized for further processing. The digitization may facility in recognition of each character in the detected text. Further, information associated with the digitized detected text is obtained. In an embodiment, the information is obtained from the data source 104. The information obtained may be information associated with the nationality of the currency note. In an embodiment, the obtained information is compared with predefined information in the data source 104 to identify the nationality of the currency note. For example, when the detected text is "THE UNITED STATES OF AMERICA", then the information may be "America". By this information, the nationality may be determined to be United states of America.

Upon identifying the nationality, the one or more characteristics of the currency note are identified by extracting object features of the currency note based on the identified nationality. In an embodiment, the object features are extracted from one or more predefined second regions on the image 102 and the one or more predefined second regions may be selected based on the identified nationality. For example, if the identified nationality is United states of America, the one or more predefined second regions may be regions where there is a probability of detecting objects in an American currency note. The extraction of the object features initially includes, performing object segmentation on the one or more predefined second regions. Based on the object segmentation and predefined object features in the data source 104, one or more objects are detected. In an embodiment, the one or more objects may be objects on the image 102, the object features may be features of the one or more objects on the image and the predefined object features may be features of one or more objects, which are stored and retrieved from the data source 104. Upon detection of the one or more objects, the object features are extracted for determining the one or more characteristics. In an embodiment, the one or more characteristics may be least one of series and denomination of the currency note. The denomination of the currency note indicates quantity value of the currency note. The series of the currency note indicates whether the currency note is one of old currency note and new currency. In an embodiment, the series may include year of release of the currency note.

Figure 2A:
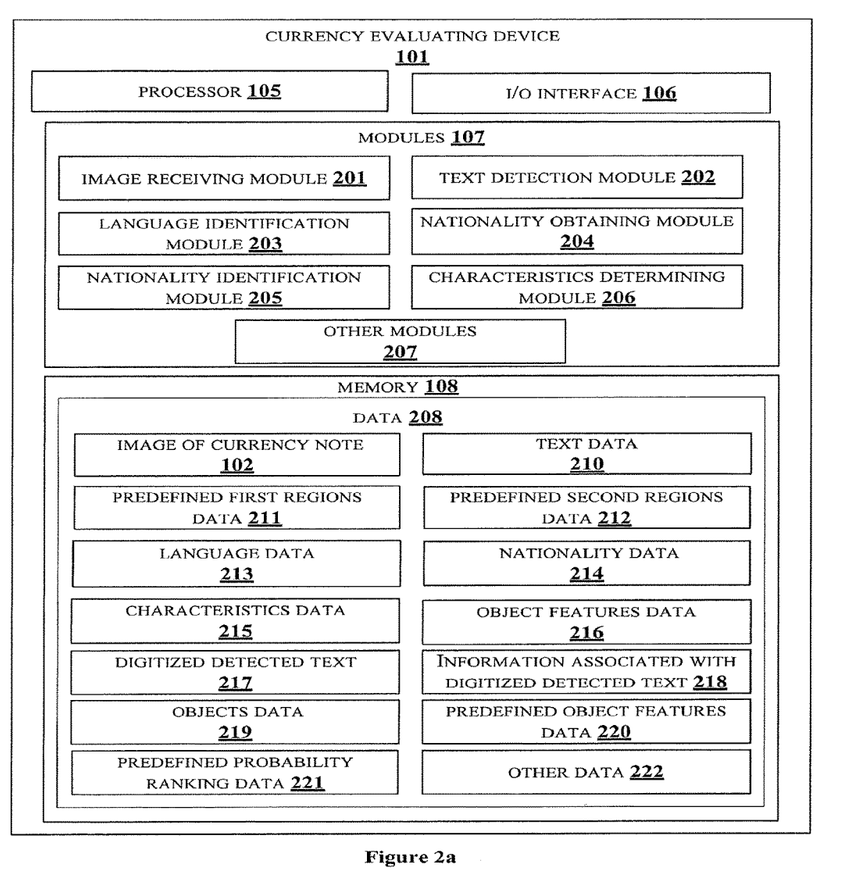
FIG. 2a shows a detailed block diagram of a currency evaluating device for determining one or more characteristics of a currency note in accordance with some embodiments of the present disclosure.

FIG. 2a shows a detailed block diagram of a currency evaluating device 101 for determining one or more characteristics of the currency note 102 in accordance with some embodiments of the present disclosure.

Data 208 in the memory 108 and one or more modules 107 of the currency evaluating device 101 may be described herein in detail.

In one implementation, the one or more modules 107 may include, but are not limited to, an image receiving module 201, a text detection module 202, a language identification module 203, a nationality obtaining module 204, a nationality identification module 205, characteristics determining module 206 and one or more other modules 207 associated with the currency evaluating device 101.

In an embodiment, data 208 in the memory 108 comprises the image of the currency note 102, a text data 210 (may be also referred as the text 210), one or more predefined first regions data 211 (may be also referred as the one or more predefined first regions 211), one or more predefined second regions data 212 (may be also referred as the one or more predefined second regions 212), language data 213 (may be also referred as the language 213), nationality data 214 (may be referred as the nationality 214), one or more characteristics data 215 (may be also referred as the one or more characteristics 215), one or more object features data 216 (may also referred as the one or more object features 216), digitized detected text 217, information associated with digitized detected text 218, objects data 219 (may also be referred as the object 219), predefined object features data 220 (may also be referred as the predefined object features 220), predefined probability ranking data 221 (also referred as the probability raking data 221) and other data 222 associated with the currency evaluating device 101.

In an embodiment, the data 208 in the memory 108 may be processed by the one or more modules 107 of the currency evaluating device 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

The image receiving module 201 receives the image of the currency note 102 for which the one or more characteristics 215 is to be determined. The image of the currency note 102 may be captured by an image capturing device which may be associated with the currency evaluating device 101. In an embodiment, captured image of the currency note 102 may be communicated to the currency evaluating device 101 via the communication network 103 by the image capturing device in the system 100. In another embodiment, the image capturing device may be integrated within the currency evaluating device 101 (not shown in figures).

Figure 2B:
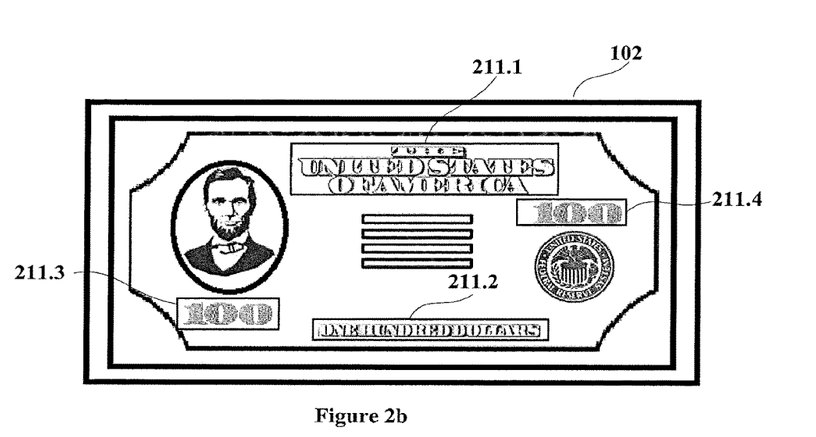
FIG. 2b illustrates exemplary one or more first predefined regions in an image of a currency note in accordance with some embodiments of present disclosure.

Upon receiving the image 102, the text 210 from the one or more predefined first regions 211 of the image 209 are detected by the text detection module 202. As described previously, the one or more predefined first regions 211 may be selected based the predefined probability ranking. FIG. 2b illustrates exemplary one or more predefined first regions on the image 102. Consider the one or more predefined first regions may be 211.1, 211.2, 211.3 and 211.4 on the image 102 as shown in FIG. 2b. Based on the predefined probability ranking, consider the predefined first region 211.1 to be top ranked region, the predefined first region 211.2 to be second ranked region, the predefined first region 211.3 to be third ranked region and the predefined first region 211.4 to be least ranked region. Therefore, detection of the text 210 is performed on the predefined first region 211.1 initially. In an embodiment, the detection of the text 210 may be not performed on subsequent ranked one or more predefined first regions 211 when the text 210 is already detected in the previous ranked one or more predefined first region 211.

Upon detecting the text 210, the language identification module 203 identifies the language 213 associated with the detected text 210. In an embodiment, natural language processing may be implemented for identifying the language 213. In another embodiment, one or more computational approaches, known to person skilled in the art, may be implemented for identifying the language 213. The determined languages 213 may be, but not limited to, Hindi, English, Chinese, Japanese, Arabic and so on. From the exemplary illustrated in FIG. 2b, consider the text 210 is detected in the predefined first region 211.1, then the language 213 associated with the text 210 is English.

Further, the nationality obtaining module 204 obtains one of the single nationality and the plurality of nationalities from the data source 104 associated with the currency evaluating device 101. One of the single nationality and the plurality of nationalities is obtained based on the language 213 for identifying the nationality 214 of the currency note. As described previously, single nationality is obtained when the language 213 associated with currency notes of single nationality only. The plurality of nationalities is obtained when the language 213 is associated with currency notes of the plurality of nationalities. When the single nationality is obtained, the nationality identification module 205 identifies the obtained single nationality to be the nationality 214 of the currency note. When plurality of nationalities is obtained, the nationality identification module 205 identifies the nationality 214 from the plurality of nationalities using the OCR. The OCR includes performing electronic OCR on the detected text 210. In an embodiment, one or more processing techniques for character recognition may be implemented for performing the OCR. The detected text 210 may be recognised by digitizing the detected text 210 and the OCR performs the digitization of the detected text 210 for the recognition. Further, information associated with the digitized detected text 218 is obtained from the data source 104. The information 218 obtained may be information associated with the nationality 214 of the currency note by which the digitized detected text 217 is recognized. In an embodiment, the obtained information 218 is compared with predefined information in the data source 104 to recognize the text 210 and further based on the recognition, the nationality 214 of the currency note is identified. For example, in FIG. 2b, consider the detected text 210 is "THE UNITED STATES OF AMERICA". From this detected text 210, upon performing the OCR, the currency evaluating device 101 may recognise the text 210 and based on the information 218, the currency evaluating device 101 identifies the nationality 214 of the currency note to be associated with United States of America.

Figure 2C:
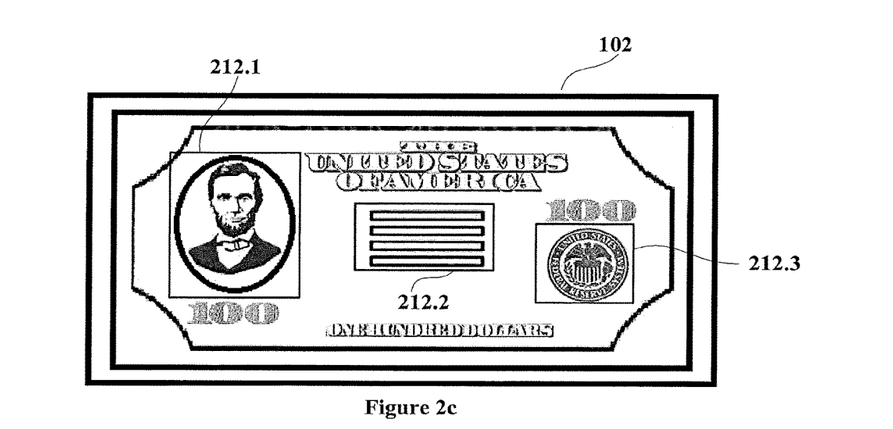
FIG. 2c illustrates exemplary one or more second predefined regions in an image of a currency note in accordance with some embodiments of present disclosure.

Upon identifying the nationality 214, the characteristics determining module 206 determines the one or more characteristics 215 of the currency note by extracting object features 216 of the currency note based on the identified nationality 214. In an embodiment, the object features 216 are extracted from the one or more predefined second regions 212 of the currency note and the one or more predefined second regions 212 may be selected based on the identified nationality 214. Every nationality is associated with one or more predefined second regions 212 for extracting the object features 216. Consider, the identified nationality 214 to be United States of America, the exemplary illustration of the one or more predefined second regions 212 i.e., 212.1, 212.2 and 212.3 on the image 102 is shown in FIG. 2c. These one or more predefined second regions 212 vary based on the identified nationality 214. Upon selecting the one or more predefined second regions 212, the object segmentation is performed on the on the one or more predefined second regions 212. In an embodiment, the object segmentation is performed to locate objects and boundaries i.e., lines, curves in the predefined second regions 212 of the currency note. One or more techniques of the object segmentation, known to the person skilled in the art, may be implemented in the present disclosure for performing the object segmentation. In an embodiment, the one or more techniques of the object segmentation may be based on thresholding, edge detection, connected component analysis performed on the predefined second regions 212.

Further, based on the object segmentation and the predefined object features 220, one or more objects 219 are detected. In an embodiment, the predefined object features 220 may be retrieved from the data source 104 associated with the currency evaluating device 101. In an embodiment, the predefined object features 220 may be features of the one or more objects 219 stored in the data source 104. The one or more detected objects 219 may be objects on the currency note. In an embodiment, a feature matching technique may be implemented, where output of the object segmentation may be compared with the predefined object features 220, retrieved from the data source 104, to detect the one or more objects 219 on the image of currency note.

Upon detection of the one or more objects 219, the object features 216 of the one or more detected objects 219 are extracted for determining the one or more characteristics 215. In an embodiment, the one or more characteristics 215 may be at least one of series and denomination of the currency note. The denomination of the currency note indicates quantity value of the currency note. For example, in the FIG. 2b, the denomination may be determined as 100 dollars. The series of the currency note indicates whether the currency note is one of old currency note and new currency note. In an embodiment, the series may include year of release of the currency note. In an embodiment, information associated with the series of each of the currency notes of plurality of nationality may be stored in the data base 104. In an embodiment, the information associated with the series may include, but not limited to, predefined location of the one or more objects in each of the currency notes. In an embodiment, the extracted one or more detected objects 219 may be compared with the information associated with the series to determine the series of the one or more currency notes.

In an embodiment, one or more characteristics 215 may include, but are not limited to, serial number of the currency note. The serial number may be an identification number of the currency note issued by a bank associated with the currency note. In an embodiment, one or more other modules 107 the currency evaluating device 101 may include a sorting module. The sorting module may be configured to sort plurality of currency notes based on the serial number of each of the plurality of currency notes.

In an embodiment, the one or more other modules 107 may include an updating module. The updating module may be configured to update the currency evaluating device 101 when the one or more characteristics 215 is not determined by the currency evaluating device 101. In an embodiment, the updating may include updating of the database 104, with at least one of new predefined first regions, new predefined second regions, new predefined object features, new predefined probability ranking and new one or more characteristics associated with the currency notes.

The other data 222 may store data, including temporary data and temporary files, generated by modules for performing the various functions of the currency evaluating device 101. The one or more modules 107 may also comprise other modules 207 to perform various miscellaneous functionalities of the currency evaluating device 101. It will be appreciated that such modules may be represented as a single module or a combination of different modules.

Figure 3:
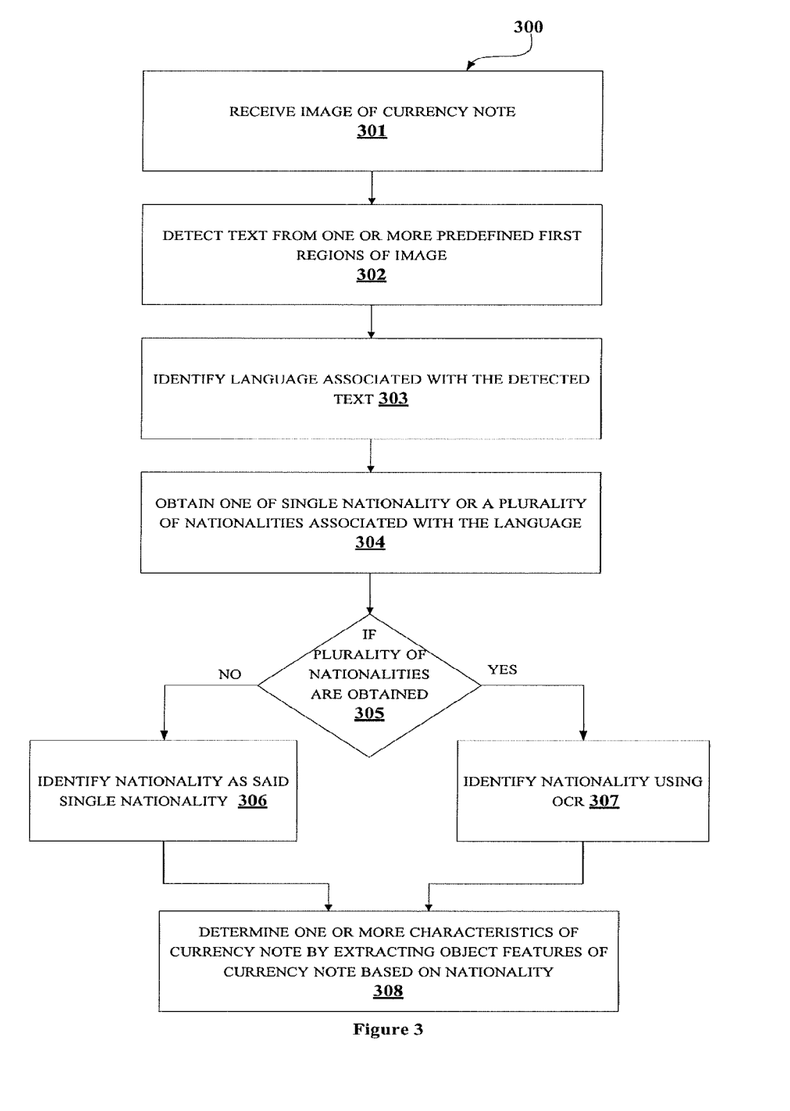
FIG. 3 illustrates a flowchart showing a method for determining one or more characteristics of a currency note in accordance with some embodiments of present disclosure.

FIG. 3 illustrates a flowchart showing a method for determining one or more characteristics 215 of a currency note in accordance with some embodiments of present disclosure.

As illustrated in FIG. 3, the method 300 comprises one or more blocks for executing processes in the currency evaluating device 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 301, the image receiving module 201 receives the image 102 of the currency note for which the one or more characteristics 215 is to be determined. In an embodiment, the image 102 may be pre-processed. The pre-processing includes one or more enhancement techniques, known to the person skilled in the art, to reduce noise associated with the image 102 and enhance quality of the image 102. In an embodiment, the pre-processing may also include cropping of Region of Interest (ROI) from the image 102.

At block 302, the text detection module 202 detects the text 210 from the one or more predefined first regions 211 of the image 102. The one or more predefined first regions 211 are selected based on the predefined probability ranking 221. In an embodiment, the predefined probability ranking 221 may be based on probability of occurrence of the text 210 in the one or more predefined first regions 211 on the currency note. Region from the one or more predefined first regions 211 with highest probability may be ranked $1^{st}$ and region from the one or more predefined first regions 211 with lowest probability may be ranked last.

At block 303, the language identification module 203 identifies the language 213 associated with the detected text 210. The identified language 213 may be associated with currency notes of one of single nationality and plurality of nationalities.

At block 304, based on the identified language 213, the nationality obtaining module 204 obtains one of the single nationality and the plurality of nationalities from the data source 104 associated with the currency evaluating device 101. The single nationality is obtained when the language associated with currency notes of single nationality. The plurality of nationalities is obtained when the language 213 is associated with currency notes of the plurality of nationalities.

At block 305, upon obtaining one of the single nationality and the plurality of nationalities, check if the obtained nationality refers to plurality of nationalities.

At block 306, when the obtained nationality does not refer to plurality of nationalities at block 305 i.e., when the obtained nationality is single nationality, the nationality identification module 205 identifies the nationality 214 to be the single nationality.

At block 307, when the obtained nationality refers to plurality of nationalities at block 305, the nationality identification module 205 identifies the nationality 214 from the plurality of nationalities.

At block 308, the characteristics determining module 206 determines the one or more characteristics 215 of the currency note by extracting object features 216 of the currency note based on the identified nationality 214. In an embodiment, the object features 216 are extracted from the one or more predefined second regions 212 on the image 102 of the currency note. The one or more predefined second regions 212 may be selected based on the identified nationality 214.

Figure 4:
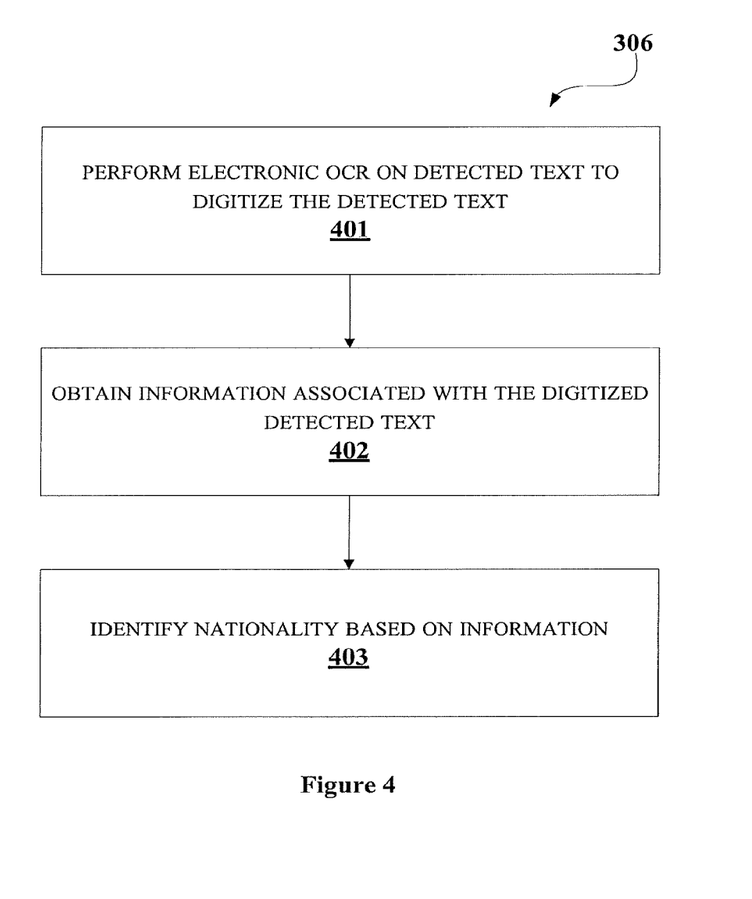
FIG. 4 illustrates a flowchart showing a method for identifying nationality of a currency note using OCR in accordance with some embodiments of present disclosure.

FIG. 4 illustrates a flowchart showing a method for identifying nationality 214 of a currency note using OCR in accordance with some embodiments of present disclosure.

As illustrated in FIG. 4, the method 400 comprises one or more blocks for identifying the nationality 214 of the currency note using the OCR. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

When the plurality of nationalities is obtained at block 304, the nationality identification module 205 identifies the nationality 214 from the plurality of nationalities using the OCR at block 306. The below steps indicate method for identifying the nationality 214 using the OCR.

At block 401, the electronic OCR is performed on the detected text 210 to digitize the detected text 210. In an embodiment, one or more characters associated with the detected text 210 may be recognised using the OCR. The one or more characters may be alphabets and numbers associated with the detected text 210. For example, consider the detected text is "THE UNITED STATES OF AMERICA". The detected text is digitized using OCR and alphabets in the detected text is recognised.

At block 402, the information 218 associated with the digitized detected text 217 is obtained. The information 218 may be stored in the data source 104 associated with the currency evaluating device 101 and may be retrieved by the currency evaluating device 101 from the data source 104. The information may be retrieved based on the digitized detected text 217. Further to the above illustrated example, the information associated with the detected text may be America.

At block 403, the nationality 214, from the plurality of nationalities, is identified based on the obtained information 218. For example, if obtained information is America, the nationality of the currency note may be identified to be as United of states of America.

Figure 5:
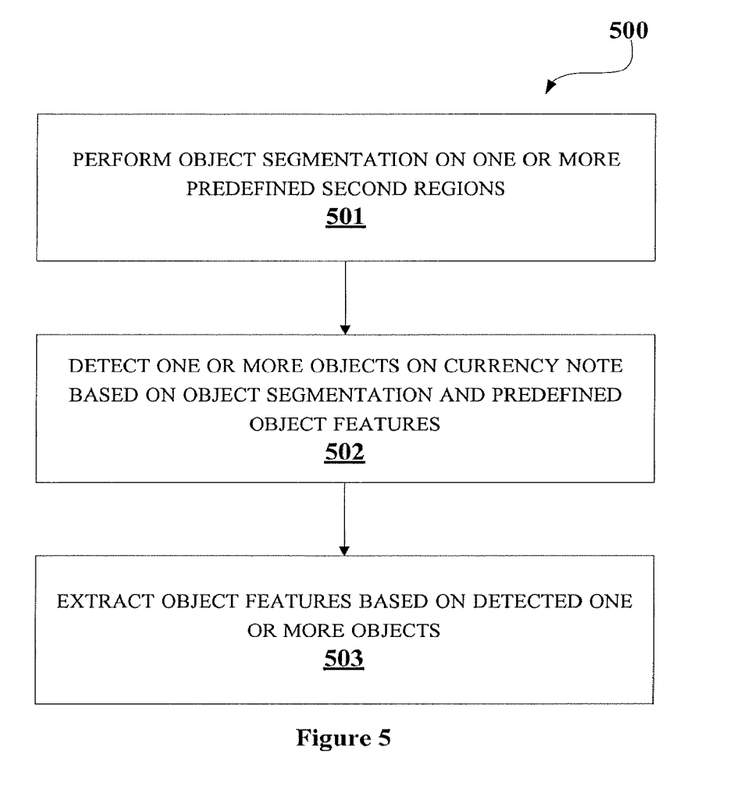
FIG. 5 illustrates a flowchart showing a method for extracting object features of a currency note in accordance with some embodiments of present disclosure.

FIG. 5 illustrates a flowchart showing a method for extracting object features 216 of a currency note in accordance with some embodiments of present disclosure.

As illustrated in FIG. 5, the method 500 comprises one or more blocks for extracting the object features 216 of the currency note. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the object segmentation is performed on the one or more predefined second regions 212. The one or more predefined second regions 212 are selected based the identified nationality 214.

At block 502, based on the object segmentation and the predefined object features 220, the one or more objects 219 on the image 102 of the currency note are detected. The predefined object features 220 may be retrieved from the data source 104.

At block 503, based on the detected one or more objects 219, the object features 216 of the one or more detected objects 219 are extracted. Further, the one or more characteristics 215 are determined based on the extracted object features.

Computing System

Figure 6:
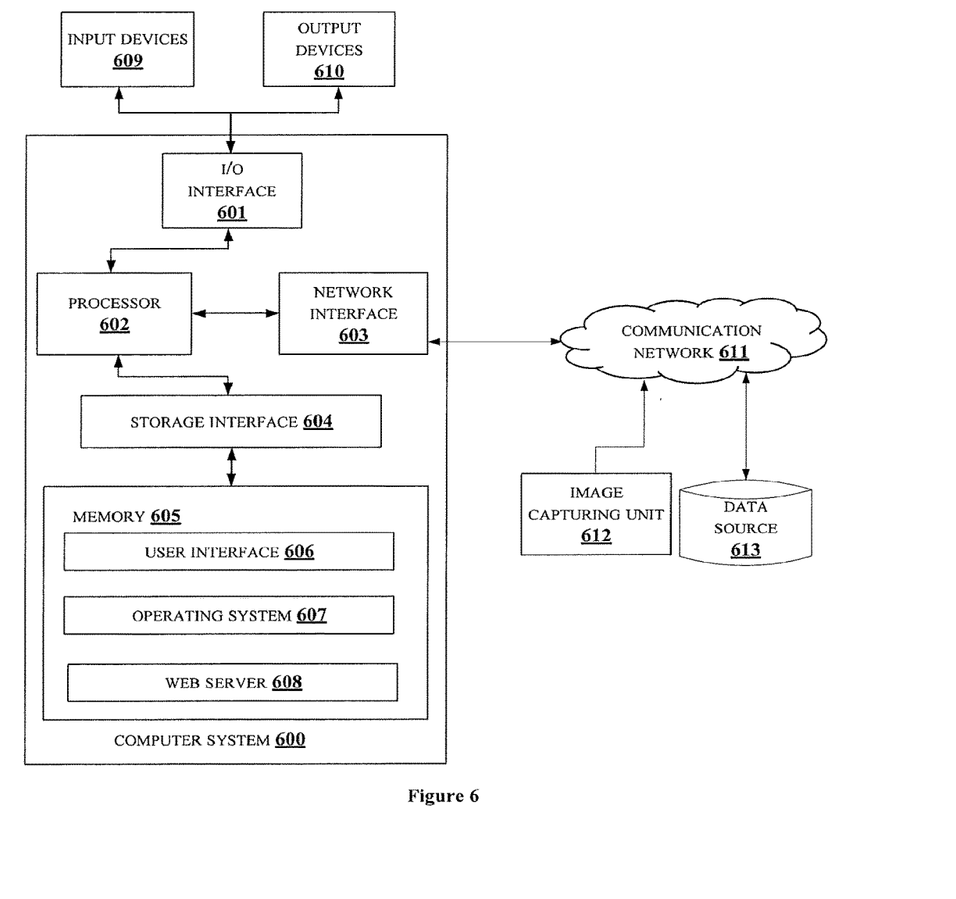
FIG. 6 illustrates a block diagram of an exemplary computer system for implementing embodiments consistent with the present disclosure.

FIG. 6 illustrates a block diagram of an exemplary computer system for implementing embodiments consistent with the present disclosure. In an embodiment, the computer system 600 is used to implement the currency evaluating device 101. The computer system 600 may comprise a central processing unit ("CPU" or "processor") 602. The processor 602 may comprise at least one data processor for executing processes in Virtual Storage Area Network. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 601, the computer system 600 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 600 consists of a process execution server. The processor 602 may be disposed in communication with the communication network 611 via a network interface 603. The network interface 603 may communicate with the communication network 611. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 611 may include, without limitation, a direct interconnection, local area network (LAN), wide area network (WAN), wireless network (e.g., using Wireless Application Protocol), the Internet, etc. Using the network interface 603 and the communication network 611, the computer system 600 may communicate with a data source 613 and an image capturing device 612 to obtain image of a currency note 612 for which one or more characteristics is to be determined. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 611 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface 606, an operating system 607 etc. In some embodiments, computer system 600 may store user/application data 606, such as, the data, variables, records, etc., as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure discloses an efficient device for determining nationality of the currency note.

An embodiment of the present disclosure discloses a device for determining one or more characteristic of the currency note without inputting nationality of the currency note.

An embodiment of the present disclosure discloses a single device for determining characteristics of currency notes of plurality of nationalities.

An embodiment of the present disclosure provisions lesser computational time by processing predefined region on image of currency note.

An embodiment of the present disclosure provides a method to identify nationality of a currency note independent of change in one or more characteristics in the currency note.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fibre, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3, FIG. 4 and FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for determining one or more characteristics of a currency note, comprising:
    receiving, by a currency evaluating device, an image of a currency note;
    detecting, by the currency evaluating device, text from one or more predefined first regions of the image;
    identifying, by the currency evaluating device, language associated with the detected text;
    obtaining, by the currency evaluating device, one of a single nationality or a plurality of nationalities associated with the language of the currency note from a data source associated with the currency evaluating device;
    identifying, by the currency evaluating device, nationality of the currency note as said single nationality, when the single nationality is obtained;
    identifying, by the currency evaluating device, nationality of the currency note from the plurality of nationalities using Optical Character Recognition (OCR), when the plurality of nationalities is obtained; and
    determining, by the currency evaluating device, the one or more characteristics of the currency note by extracting object features of the image based on the identified nationality.

2. The method as claimed in claim 1, wherein the one or more predefined first regions are selected based on a predefined probability ranking.

3. The method as claimed in claim 1, wherein the identifying the nationality using the OCR comprises:
    performing electronic OCR on the detected text to digitize the detected text;
    obtaining information associated with the digitized detected text from the data source; and
    identifying the nationality based on the information, wherein the information is compared with predefined information in the data source to identify the nationality.

4. The method as claimed in claim 1, wherein the object features are extracted from one or more predefined second regions of the image, wherein the one or more predefined second regions are selected based on the identified nationality.

5. The method as claimed in claim 4, wherein extracting the object features comprises:
    performing object segmentation on the one or more predefined second regions;
    detecting one or more objects on the image based on the object segmentation and predefined object features in the data source; and
    extracting the object features based on the detected one or more objects.

6. The method as claimed in claim 1, wherein the one or more characteristics comprises at least one of series and denomination of the currency note.

7. A currency evaluating device for determining one or more characteristics of a currency note, comprises:
    a processor; and
    a memory communicatively coupled to the processor, wherein the memory stores processor-executable instructions, which, on execution, cause the processor to:
        receive an image of a currency note;
        detect text from one or more predefined first regions of the image;
        identify language associated with the detected text;
        obtain one of a single nationality or a plurality of nationalities associated with the language of the currency note from a data source associated with the currency evaluating device;
        identify nationality of the currency note as said single nationality, when the single nationality is obtained;
        identify nationality of the currency note from the plurality of nationalities using Optical Character Recognition (OCR), when the plurality of nationalities is obtained; and
        determine the one or more characteristics of the currency note by extracting object features of the image based on the identified nationality.

8. The currency evaluating device as claimed in claim 7, wherein the one or more predefined first regions are selected based on a predefined probability ranking.

9. The currency evaluating device as claimed in claim 7, wherein the identifying the nationality using the OCR comprises:
    performing electronic OCR on the detected text to digitize the detected text;
    obtaining information associated with the digitized detected text from the data source; and
    identifying the nationality based on the information, wherein the information is compared with predefined information in the data source to identify the nationality.

10. The currency evaluating device as claimed in claim 7, wherein the object features are extracted from one or more predefined second regions on the image, wherein the one or more predefined second regions are selected based on the identified nationality.

11. The currency evaluating device as claimed in claim 10, wherein extracting the object features comprises:
    performing object segmentation on the one or more predefined second regions;
    detecting one or more objects on the image based on the object segmentation and predefined object features in the data source; and
    extracting the object features based on the detected one or more objects.

12. The currency evaluating device as claimed in claim 7, wherein the one or more characteristics comprises at least one of series and denomination of the currency note.

* * * * *